(12) United States Patent
Oh

(10) Patent No.: US 11,987,022 B2
(45) Date of Patent: May 21, 2024

(54) TILE-TYPE DECORATIVE FLOORING MATERIAL COMPRISING NON-SLIP FOAM, AND METHOD FOR MANUFACTURING SAME

(71) Applicants: DONGSHIN POLYMER CO., LTD., Chungcheongnam-do (KR); SHINKO KASEI CO., LTD., Saitama (JP)

(72) Inventor: Dong Jin Oh, Chungcheongnam-do (KR)

(73) Assignees: DONGSHIN POLYMER CO., LTD., Chungcheongnam-do (KR); SHINKO KASEI CO., LTD., Saitama (JP)

(*) Notice: Subject to any disclaimer, the term of this patent is extended or adjusted under 35 U.S.C. 154(b) by 0 days.

(21) Appl. No.: 17/761,372

(22) PCT Filed: Jan. 28, 2021

(86) PCT No.: PCT/KR2021/001166
§ 371 (c)(1),
(2) Date: Mar. 17, 2022

(87) PCT Pub. No.: WO2021/162296
PCT Pub. Date: Aug. 19, 2021

(65) Prior Publication Data
US 2022/0371307 A1    Nov. 24, 2022

(30) Foreign Application Priority Data
Feb. 10, 2020    (KR) .................. 10-2020-0015906

(51) Int. Cl.
*B32B 27/06* (2006.01)
*B32B 3/30* (2006.01)
(Continued)

(52) U.S. Cl.
CPC .............. *B32B 27/065* (2013.01); *B32B 3/30* (2013.01); *B32B 5/18* (2013.01); *B32B 7/12* (2013.01);
(Continued)

(58) Field of Classification Search
CPC ........... B32B 27/065; B32B 3/30; B32B 5/18; B32B 7/12; B32B 27/08; B32B 27/20;
(Continued)

(56) References Cited

U.S. PATENT DOCUMENTS

2004/0241416 A1* 12/2004 Tian ..................... D06N 7/0013
428/161
2012/0128946 A1* 5/2012 Kwon .................... B32B 27/42
428/297.4
(Continued)

FOREIGN PATENT DOCUMENTS

| JP | 2004-107845 A | 4/2004 |
| JP | 2017-155568 A | 9/2017 |

(Continued)

*Primary Examiner* — Nathan L Van Sell
(74) *Attorney, Agent, or Firm* — NKL LAW; Jae Youn Kim

(57) ABSTRACT

A tile-type decorative flooring material includes a surface-processed layer, a clear layer, a design-print layer, an under-layer, and a micro-embossed plastic foam part having a plastic foam layer and an adhesive film layer with micro-embossing. The flooring material provides a significant improvement in terms of slippage between the product and the floor surface in a construction process not using an adhesive.

11 Claims, 1 Drawing Sheet

(51) Int. Cl.

| | | |
|---|---|---|
| *B32B 5/18* | (2006.01) | |
| *B32B 7/12* | (2006.01) | |
| *B32B 27/08* | (2006.01) | |
| *B32B 27/20* | (2006.01) | |
| *B32B 27/22* | (2006.01) | |
| *B32B 27/30* | (2006.01) | |
| *B32B 27/32* | (2006.01) | |
| *B32B 37/12* | (2006.01) | |
| *B32B 37/15* | (2006.01) | |
| *B32B 38/00* | (2006.01) | |
| *B32B 38/06* | (2006.01) | |
| *C08J 9/10* | (2006.01) | |
| *E04F 15/02* | (2006.01) | |
| *E04F 15/10* | (2006.01) | |

(52) U.S. Cl.
CPC .............. *B32B 27/08* (2013.01); *B32B 27/20* (2013.01); *B32B 27/22* (2013.01); *B32B 27/304* (2013.01); *B32B 27/32* (2013.01); *B32B 37/12* (2013.01); *B32B 37/153* (2013.01); *B32B 38/06* (2013.01); *C08J 9/103* (2013.01); *E04F 15/0215* (2013.01); *E04F 15/105* (2013.01); *B32B 2038/0084* (2013.01); *B32B 2255/10* (2013.01); *B32B 2255/26* (2013.01); *B32B 2264/0242* (2013.01); *B32B 2266/025* (2013.01); *B32B 2305/022* (2013.01); *B32B 2307/732* (2013.01); *B32B 2307/744* (2013.01); *B32B 2323/00* (2013.01); *B32B 2327/06* (2013.01); *B32B 2419/04* (2013.01); *C08J 2201/03* (2013.01); *C08J 2203/04* (2013.01); *C08J 2323/02* (2013.01)

(58) Field of Classification Search
CPC ....... B32B 27/22; B32B 27/304; B32B 27/32; B32B 37/12; B32B 37/153; B32B 38/06; B32B 2038/0084; B32B 2255/10; B32B 2255/26; B32B 2264/0242; B32B 2266/025; B32B 2305/022; B32B 2307/732; B32B 2307/744; B32B 2323/00; B32B 2327/06; B32B 2419/04; B32B 2255/102; B32B 5/02; B32B 5/20; B32B 27/12; B32B 27/36; B32B 2260/021; B32B 2260/046; B32B 2262/101; B32B 2307/412; B32B 2405/00; B32B 38/14; C08J 9/103; C08J 2201/03; C08J 2203/04; C08J 2323/02; C08J 2323/06; C08J 2323/12; C08J 2327/06; E04F 15/0215; E04F 15/105; E04F 15/02155; E04F 15/107; E04F 15/181; E04F 15/206; E04F 2290/043; E04F 15/203; E04F 15/22; E04F 2290/04

See application file for complete search history.

(56) References Cited

U.S. PATENT DOCUMENTS

| | | | |
|---|---|---|---|
| 2015/0337543 A1 | 11/2015 | Dossche et al. | |
| 2018/0171644 A1* | 6/2018 | Zhang | .................. B32B 27/065 |
| 2019/0024390 A1* | 1/2019 | Yasuda | ..................... B32B 5/02 |

FOREIGN PATENT DOCUMENTS

| | | | |
|---|---|---|---|
| JP | 2018-048538 | A | 3/2018 |
| KR | 10-0510836 | B1 | 8/2005 |
| KR | 10-0600841 | B1 | 7/2006 |
| KR | 10-2010-0081283 | A | 7/2010 |
| KR | 10-2012-0018456 | A | 3/2012 |
| KR | 10-1149890 | B1 | 5/2012 |
| KR | 10-1866800 | B1 | 6/2018 |
| KR | 10-2019-0036690 | A | 4/2019 |

* cited by examiner

TILE-TYPE DECORATIVE FLOORING MATERIAL COMPRISING NON-SLIP FOAM, AND METHOD FOR MANUFACTURING SAME

TECHNICAL FIELD

The present invention relates to a decorative flooring material applicable to a bottom or floor of a building, and more particularly, to a tile-type decorative flooring material with a significant improvement in terms of slippage between the product and the floor surface in a construction process not using an adhesive in tile-structured products cut and constructed in unit sizes among decorative flooring material products.

BACKGROUND ART

The background art of the present disclosure provided herein may not necessarily mean known art.

In general, (decorative) flooring materials such as flooring pads or tiles are installed on a bottom or floor of a building. The flooring materials such as flooring pads or tiles are manufactured using vinyl chloride as a main material that is light, flexible, and excellent in cushioning and sound-absorbing properties. For example, the flooring material is manufactured by mixing or laminating other materials with polyvinyl chloride (PVC) or vinyl chloride. The above flooring material is usually laminated in multiple layers such as a clear layer, a printed layer, a resin-impregnated dimension reinforcement layer, a foaming layer, and an underlayer, in which the clear layer has a function of protecting an ink side printed on the printed layer, the printed layer has a decorative function of giving a color or pattern, the resin-impregnated dimension reinforcement layer refers to a glass-fiber impregnated with PVC paste sol and has a function of reinforcing dimensional safety of a product, the foam layer has a function of providing cushioning, and the underlayer has a function of reinforcing a thickness and anchoring with a floor surface.

In addition a surface-processed layer for improving abrasion resistance or scratch resistance may be further formed on the top of the clear film layer as needed. The above flooring material is produced by adding or subtracting each layer according to the purpose, and used in a wide range of fields.

For example, the following Patent Document 1 applied by the applicant of the present disclosure and registered discloses a technology related to the method for manufacturing of a decorative flooring material in which glass fiber or rock wool is prepared into a sheet between an upper PVC layer and a lower PVC layer to form a glass fiber mat layer, a printing layer and a clear film layer formed of PVC resin are sequentially formed on the top of a base layer prepared by hot pressing the glass fiber mat layer, and a balance layer composed of PVC resin, plasticizers and fillers is formed under the bottom of the base layer. The flooring material of the above configuration may be used solely or used after attached to various types of adherends with an adhesive therebetween in the process of finishing the floor of the building.

In addition recently, in order to remove the odor caused by using adhesives and minimize the influence of volatile organic compounds, flooring materials having an anti-slip function have been developed for forming a functional layer under the base layer to prevent the slip, thereby minimizing the use of adhesives during construction.

Meanwhile, in the case of general flooring materials, especially floor tiles cut into a unit size, an adhesive is applied to the floor and the tiles are installed thereon, and accordingly, it is common to minimize changes in dimensions after the tiles adhere to the floor. However, recently, the maleficence of adhesives are highlighted, and flooring materials for minimizing changes in dimensions have been developed. Thus, loose-lay products, which are installed without applying adhesives or installed by simply placing the products with a small amount of adhesive on the floor, have been variously developed, and spotlighted as products facilitating the installation, reducing costs, and having no harmful effects of adhesives.

In general, the loose-lay product is manufactured by laminating a material, which has excellent adhesion to the floor, on a rear surface of the flooring material. Regarding a product to which an olefin-based foam combined with polyethylene, polypropylene or the like adheres for absorbing impact sound, the foam has poor adhesion to the floor, and accordingly the loose-lay construction fails due to the slip. Thus, the adhesive is required to be used.

In order to improve this, various attempts are being conducted, such as treating a treatment agent having an adhesive function on a rear surface of plastic foam or laminating an adhesive sheet. However, adhesion during storage, that is a blocking, is caused, adhesive components are transferred, or a surface layer of the flooring material is damaged.

In particular, to improve the above problems, Patent Application No. 10-2010-0081283 (Aug. 23, 2010) discloses a product easily constructed by laminating an adhesive layer on a rear surface of a flooring material and adhering a release paper thereto. However, since the adhesive and the release paper are adhered, the handling is inconvenient, the process is complicated, and a separate facility is required, thereby increasing the costs.

PRIOR ART DOCUMENTS (Patent Document 1) Korean Patent Registration Publication No. 10-0510836 (registered on Aug. 30, 2005)
(Patent Document 2) Korean Patent Registration Publication No. 10-0600841 (registered on Jul. 6, 2006)
(Patent Document 3) Korean Patent Registration Publication No. 10-1149890 (registered on May 18, 2012)

DISCLOSURE

Technical Problem

The present invention provides a tile-type decorative flooring material as a product laminated with plastic foam having an impact sound-absorption function, which has a significant improvement in terms of slippage between the product and the floor surface among products that do not use adhesives during installation or are installed on a place to which a small amount of adhesive is applied.

However, the object of the present invention is not limited to the above-mentioned objects, and other objects not mentioned herein will be apparently understood by those skilled in the art from the following descriptions.

Technical Solution

The present invention provides a tile-type decorative flooring material including: a flooring material part including a surface-processed layer, a clear layer, a design-print layer, an intermediate layer, a dimension reinforcement layer, an underlayer, and a balance layer; and a micro-embossed plastic foam part including a plastic foam layer and an adhesive film layer with micro-embossing.

In addition, the plastic foam layer may include 3 to 10 parts by weight of an azodicarbonamide foaming agent, 0.2 to 1.5 parts by weight of an accelerator, 0.1 to 1 part by weight of a foam stabilizer, and other additives, based on 100 parts by weight of olefin-based resin, and may be a layer formed after extrusion processed and then foamed.

In addition, the adhesive film layer may have micro-embossing in which irregularities having a depth (a) are provided at regular intervals (b), and the micro-embossing may satisfy Expression 1 below.

$$a \geq \tfrac{1}{3} * b \quad \text{[Expression 1]}$$

(herein, 0.08 mm≤a≤0.8 mm and 0.2≤b≤2 mm).

In addition, the adhesive film layer may include 0.1 to 1 part by weight of an antioxidant, 0.1 to 1 part by weight of a processing aid, and other additives, based on 100 parts by weight of olefin-based resin, and may be an olefin-based film having a thickness of 10 μm to 200 μm.

In addition, the adhesive film layer may include 30 to 60 parts by weight of a plasticizer, 1 to 5 parts by weight of a stabilizer, and other additives, based on 100 parts by weight of PVC resin, and may be a PVC film having a thickness of 10 μm to 200 μm.

In addition, the surface-processed layer may include 20 to 40 parts by weight of monoester, 10 to 20 parts by weight of oligomer, 10 to 20 parts by weight of poly diacrylate, 0.5 to 5 parts by weight of silicon, and other additives, and may be a layer coated with a thickness of 5 μm to 20 μm by ultraviolet rays and hardened by ultraviolet rays.

In addition, the clear layer may include 10 to 50 parts by weight of a plasticizer, 1 to 5 parts by weight of a stabilizer, and other additives, based on 100 parts by weight of PVC resin, and may be a layer having a thickness of 0.1 mm to 1 mm.

In addition, the design-print layer may include 1 to 20 parts by weight of a plasticizer, 1 to 5 parts by weight of a stabilizer, 0 to 20 parts by weight of a filler, 1 to 5 parts by weight of a processing aid, and other additives, based on 100 parts by weight of PVC resin, and may be a layer having a thickness of 0.05 mm to 0.2 mm.

In addition, the underlayer may include 10 to 60 parts by weight of a plasticizer, 1 to 5 parts by weight of a stabilizer, 50 to 600 parts by weight of a filler, 1 to 5 parts by weight of a processing aid, and other additives, based on 100 parts by weight of PVC resin, and may be a layer having a thickness of 0.5 mm to 5 mm.

In addition, the flooring material part further includes an intermediate layer provided between the design-print layer and the underlayer, in which the intermediate layer may include 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, and may be a layer having a thickness of 0.2 mm to 2 mm.

In addition, the flooring material part further includes any at least one layer selected from the group consisting of an intermediate layer, a dimension reinforcement layer, and a balance layer, in which the intermediate layer may include 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, and may be a layer having a thickness of 0.2 mm to 2 mm, the dimension reinforcement layer may include 50 to 90 parts by weight of a plasticizer, 1 to 5 parts by weight of a stabilizer, 10 to 150 parts by weight of a filler, 2 to 10 parts by weight of a viscosity modifier, and other additives, based on 100 parts by weight of PVC paste resin, and may be a layer formed by impregnating a glass fiber mat in a liquid paste sol and heat-hardening the impregnated glass fiber, and the balance layer may include 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, and may be a layer having a thickness of 0.3 mm to 3 mm.

In addition, the present invention provides a method for manufacturing a tile-type floor decorative flooring material, which includes: forming a flooring material part by laminating an underlayer, a design-print layer, a clear layer, and a surface-processed layer; forming a plastic foam layer by extruding a plastic foam layer composition on a rear surface of the underlayer, electron beam crosslinking, and then foaming or chemical foaming the composition; and forming an adhesive film layer by adhering an adhesive film layer composition to a rear surface of the plastic foam layer while extruding the adhesive film layer composition.

Advantageous Effects

According to the present invention, the tile-structured decorative flooring material cut and constructed in a unit size among decorative flooring material products includes a cushion layer constituting plastic foam via chemical foaming at a bottom thereof, and includes micro uneven embossing at a lower end portion of the cushion layer to prevent a slippage. Accordingly, the decorative flooring material is provided so that the cushion layer of plastic foam can improve walking experience and absorb impact sound, and the micro uneven embossing at the lower end portion can significantly improve slippage between the product and the floor surface in a construction process not using an adhesive.

In particular, recently, upon installation of the loose-lay tiles, which are developed to avoid the harmful effects of adhesives and do not use adhesives or are installed on a place to which a small amount of adhesive is applied, the sliding and slipping phenomenon of the flooring material due to the difference in adhesion level between the floor surface and the flooring material can be significantly improved.

BEST MODE

Mode for Invention

All technical and scientific terms used herein have the same meaning as commonly understood by a person having ordinary skill in the art, unless otherwise stated. Further, throughout the present specification and claims, the term "comprise, comprises, or comprising" means including the stated object, step or group of objects or steps unless otherwise specified, and does not mean excluding any other object, step, or group of objects or steps.

Prior to describing the present invention in detail below, it will be understood that the terms used herein merely are for the purpose of describing specific embodiments and are not intended to limit the scope of the present invention, which is limited only by the appended claims.

Meanwhile, various embodiments of the present invention may be combined with any other embodiments unless clearly stated otherwise. Any feature indicated as particularly preferable or advantageous may be combined with any other feature or features indicated as preferable or advantageous. Hereinafter, the embodiments of the present invention and effects thereby will be described with reference to the accompanying drawings.

Figure 1:
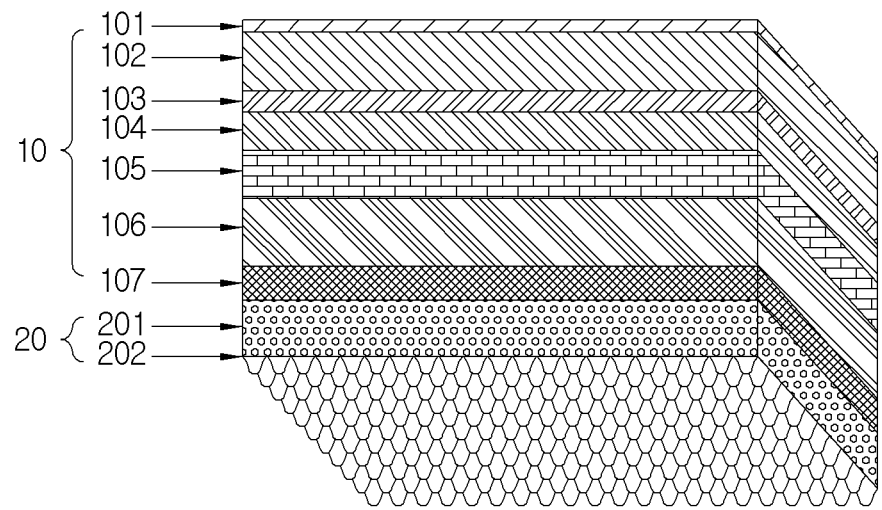
FIG. 1 shows a structure of a tile-type decorative flooring material according to one embodiment of the present invention.

A tile-type decorative flooring material according to one embodiment of the present invention includes a flooring material part 10 and micro-embossed plastic foam part 20. FIG. 1 shows a specific configuration of the tile-type decorative flooring material according to one embodiment of the present invention.

The flooring material part 10 includes a surface-processed layer 101, a clear layer 102, a design-print layer 103, an intermediate layer 104, a dimension reinforcement layer 105, an underlayer 106, a balance layer 107, and the like. The flooring material part 10 includes a surface-processed layer 101, a clear layer 102, a design-print layer 103, and an underlayer 106, and may further include an intermediate layer 104, a dimension reinforcement layer 105, and a balance layer 107, as needed.

For example, the flooring material part 10 may be formed by laminating the surface-processed layer 101, the clear layer 102, the design-print layer 103, the intermediate layer 104, the underlayer 106, and the balance layer 107, may be formed by laminating the surface-processed layer 101, the clear layer 102, the design-print layer 103, the underlayer 106, and the balance layer 107, may be formed by laminating the surface-processed layer 101, the clear layer 102, the design-print layer 103, and the underlayer 106, may be formed by laminating the surface-processed layer 101, the clear layer 102, the design-print layer 103, the intermediate layer 104, the dimension reinforcement layer 105, the underlayer 106, and the balance layer 107, or may be formed by laminating the surface-processed layer 101, the clear layer 102, the design-print layer 103, the intermediate layer 104, the dimension reinforcement layer 105, and the underlayer 106.

The tile-type decorative flooring material according to the present invention is manufactured, after forming the flooring material part, by forming a micro-embossed plastic foam part, which includes a plastic foam layer and an adhesive film layer having micro-embossing, on the bottom of the flooring material part. For example, when the flooring material part includes the surface-processed layer, the clear layer, the design-print layer, and the underlayer, the flooring material part may be formed by laminating the underlayer, the design-print layer, the clear layer and the surface-processed layer, and then the micro-embossed plastic foam part may be manufactured, by forming the plastic foam layer on a rear surface of the underlayer, and then forming the adhesive film layer on a rear surface of the plastic foam layer.

The surface-processed layer 101 serving to improve surface properties such as scratch resistance, stain resistance, abrasion resistance, and durability includes 20 to 40 parts by weight of monoester, 10 to 20 parts by weight of oligomer, 10 to 20 parts by weight of poly diacrylate, 0.5 to 5 parts by weight of silicon, and other additives, and is a layer coated by a roll coater or air knife coater, coated with a thickness of 5 μm to 20 μm by ultraviolet rays and hardened by ultraviolet rays.

The clear layer 102 serving to protect a design-print pattern of the flooring material and maintain durability against abrasion, friction, contamination, deformation and so on of the flooring material includes 10 to 50 parts by weight of a plasticizer, 1 to 5 parts by weight of a stabilizer, and other additives, based on 100 parts by weight of PVC resin, is a layer formed by a calendar process, and has a thickness of 0.1 mm to 1 mm.

The design-print layer 103 is a layer formed by giving a design pattern on a surface of a white or colored sheet by transfer printing, gravure printing, screen printing, offset printing, rotary printing or flexographic printing. The design-print layer includes 1 to 20 parts by weight of a plasticizer, 1 to 5 parts by weight of a stabilizer, 0 to 20 parts by weight of a filler, 1 to 5 parts by weight of a processing aid, 0.5 to 5 parts by weight of a pigment and other additives, based on 100 parts by weight of PVC resin, and is processed by a calendar process, in which a sheet processed to a thickness of 0.05 mm to 0.2 mm is laminated and heated.

The intermediate layer 104 is included to minimize irregularities of the design-print layer and maintain smoothness, includes 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, is a layer formed by a calendar process, and has a thickness of 0.2 mm to 2 mm.

The dimension reinforcement layer 105 is configured using a glass fiber mat to minimize a dimensional change of the flooring material part. More specifically, long glass fiber fiberized from E-glass is cut to a predetermined unit length, dispersed in white water, filtered into a sheet, processed with a binder thereon, heat-dried into a glass fiber mat as a base. The dimension reinforcement layer includes 50 to 90 parts by weight of a plasticizer, 1 to 5 parts by weight of a stabilizer, 10 to 150 parts by weight of a filler, 2 to 10 parts by weight of a viscosity modifier, and other additives, based on 100 parts by weight of PVC paste resin, including is a sheet obtained by impregnating the long glass fiber mat in a paste sol and heating and drying the impregnated long glass fiber mat, has a thickness of 0.3 mm to 6 mm, preferably 0.3 mm to 1 mm.

The underlayer 106 serving to contribute to a weight and a thickness of the flooring material and securing a hardness includes 10 to 60 parts by weight of a plasticizer, 1 to 5 parts by weight of a stabilizer, 50 to 600 parts by weight of a filler, 1 to 5 parts by weight of a processing aid, and other additives, based on 100 parts by weight of PVC resin, is a layer formed by a calendar process, and has a thickness of 0.5 mm to 5 mm.

In the underlayer, a function may be given with various configurations and thicknesses, such as providing a weight based on each combination, varying a soft or hard hardness, and adding a foam layer to provide cushioning properties.

The balance layer 107 serving to adjust a flection of the flooring material and maintain seating properties includes 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, is a layer formed by a calendar process, and has a thickness of 0.3 mm to 3 mm.

The micro-embossed plastic foam part 20 includes a plastic foam layer 201 and an adhesive film layer 202. The lowermost portion of the plastic foam layer 201 is given a micro concavo-convex embossing for widening the unit area, so that adhesion between the floor surface and the flooring material is increased, thereby preventing slippage.

The plastic foam layer 201 includes 3 to 10 parts by weight of an azodicarbonamide foaming agent, 0.2 to 1.5 parts by weight of an accelerator, 0.1 to 1 part by weight of a foam stabilizer, and other additives, based on 100 parts by weight of olefin-based resin, is a layer formed by extrusion processing, electron beam crosslinking and then foaming or chemical foaming, and has a thickness of 0.3 mm to 2 mm and a density of 20 kg/m3 to 200 kg/m3.

More specifically the plastic foam layer 201 includes olefin-based resin such as polypropylene and polyethylene, foaming agents, accelerators, foam stabilizers, and other additives, and is formed by processing a foaming base plate with an extrusion T die, irradiating an electron beam with a dose of 1 to 5 Mrad at a voltage of 200 kw to 700 kw, and then foaming while passing through a foaming oven at 200° C. to 250° C., or chemical foaming without irradiating the electron beam. Since micro-embossing is applied to the adhesive film layer 202 using an embossing roll while laminating the adhesive film layer 202, the adhesion and the embossing may be simultaneously implemented.

The adhesive film layer 202 is attached to the plastic foam layer by simultaneously attaching an olefin-based film having a thickness of 10 μm to 200 μm and including 0.1 to 1 part by weight of an antioxidant, 0.1 to 1 part by weight of a processing aid, and other additives, based on 100 parts by weight of olefin-based resin, or a PVC film having a thickness of 10 μm to 200 μm and including 30 to 60 parts by weight of a plasticizer, 1 to 5 parts by weight of a stabilizer, and other additives, based on 100 parts by weight of PVC resin while extrusion processing with T-die, or by winding up and re-laminating the film processed with T-die.

At this point, nitrile-butadiene rubber (NBR) or ethylene-vinyl acetate (EVA), acrylic resin having excellent adhesion or the like for adding adhesion to the adhesive film layer 202 may be added to maximize the function.

Regarding the embossing, a cylindrical metal roll provided with fine concavo-convex portions and having a surface temperature maintained at a temperature of 80° C. to 160° C. is pressed on the plastic foam with attaching the olefin-based resin film or PVC film, thereby providing the embossing simultaneously.

Figure 2:
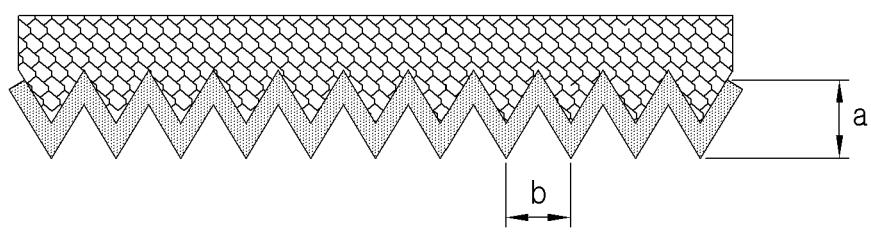
FIG. 2 shows a micro-embossed structure of an adhesive film layer according to one embodiment of the present invention.

In addition, irregularities of the embossing are alternately arranged in the machine direction and the width direction on a rear surface of the plastic foam as shown in FIG. 2 in order to maximize the unit area, so that the concave portions and the convex portions are alternately arrange repeatedly across the entire width.

The irregularities of the micro-embossing is provided with irregularities having a depth a at regular intervals b as shown in FIG. 2. At this point, the depth a of the irregularities is within the range of 0.08 mm to 0.8 mm, and greater than ⅓ of the interval b. In other words, the micro-embossing according to the present invention satisfies Expression 1 below.

$$a > ⅓ * b \quad \text{[Expression 1]}$$

(herein, 0.08 mm≤a≤0.8 mm and 0.2≤b≤2 mm)

When the above expression is satisfied, the unit area of the micro-embossed plastic foam part 20 is maximized, so as to develop the plastic foam for decorative flooring materials that can significantly improve slipping properties.

When the depth a and the interval b deviate from the above range, it is confirmed that the slippage improvement effect is insufficient because it is difficult to implement the irregularities or the unit area is small. When the depth a of the irregularities is ⅓ or less of the interval b, it is also confirmed that the slippage improvement effect is decreased because the depth of embossing is low and accordingly the unit area becomes small.

The micro-embossed plastic foam part 20 and the flooring material part 10 are adhered by a known adhering method, and the adhering may be conducted in various ways. For example, the rear surface of the flooring material part 10 may be coated with an acrylic or urethane-based adhesive by a gravure scheme or a slot die scheme, heat-dried, and then attached to the micro-embossed plastic foam part 20, the rear surface of the flooring material part 10 may be coated with a hot melt adhesive through a T-die and attached to the micro-embossed plastic foam part 20 before hardening, or the flooring material part 10 or the micro-embossed plastic foam part 20 may be coated with the hot melt type adhesive via a gravure scheme, heat-dried, and then laminated each other. At this point, it is important to ensure that the micro-embossed irregularities are prevented from being disappeared or changed.

In the decorative flooring material according to the present invention, the plastic foam part processed using polyolefin-based resin such as polyvinyl chloride resin, and polyethylene, polypropylene and embodied with the micro-embossing is laminated on the bottom of the tile-shaped flooring material. Thus, walking experience and impact sound absorption due to the plastic cushion are excellent, the slippage is improved by the micro-embossing on the rear surface, thereby increasing the adhesion between the floor and the product even in the loose-lay construction that does not use adhesives, so that the slippage is prevented.

Example

From the bottom, the flooring material part is formed by laminating the balance layer, the underlayer, the intermediate layer, the design-print layer, the clear layer, and the surface-processed layer. The micro-embossed plastic foam part, which includes the plastic foam layer (thickness of 1.0 mm) and the adhesive film layer (thickness of 10 μm), is laminated on the rear surface of the balance layer.

When the density is 100 kg/m3 and the adhesive film layer formed of an olefin-based resin is laminated on an olefin-based foam having a thickness of 1.0 mm, the micro-embossing having various depths a and intervals b is formed using a metal roll. The embossing condition formed on the adhesive film layer is shown in Table 1 below.

Experimental Example

The slip property is tested on the flooring material manufactured as above. The test is conducted by using a pendulum of BS-7976-2, which is the standard for slip tests on floors and roads. The surface to which the plastic foam adheres is used to compare the slipping degree of the pendulum. In order to maximize an influence due to the slip the test is subject to a distance of 6 mm between a contact part and a slider. The measured pendulum test values are shown in Table 1 below.

TABLE 1

|  | a | b | ① | ② | ③ | Coefficient of friction |
|---|---|---|---|---|---|---|
| Example 1 | 0.60 | 1.00 | ○ | ○ | ○ | 45 |
| Example 2 | 0.50 | 1.00 | ○ | ○ | ○ | 40 |
| Example 3 | 0.40 | 0.50 | ○ | ○ | ○ | 46 |
| Example 4 | 0.25 | 0.50 | ○ | ○ | ○ | 42 |
| Example 5 | 0.15 | 0.30 | ○ | ○ | ○ | 56 |
| Example 6 | 0.10 | 0.30 | ○ | ○ | ○ | 50 |
| Comparative Example 1 | 0 | 0 | x | x | x | 27 |
| Comparative Example 2 | 0.50 | 2.00 | ○ | ○ | x | 29 |
| Comparative Example 3 | 0.30 | 1.00 | ○ | ○ | x | 36 |
| Comparative Example 4 | 0.10 | 0.50 | ○ | ○ | x | 35 |
| Comparative Example 5 | 0.05 | 0.30 | x | ○ | x | 31 |
| Comparative Example 6 | 0.05 | 0.10 | x | x | ○ | 33 |

① 0.08 ≤ a ≤ 0.8
② 0.2 ≤ b ≤ 2
③ a ≥ 1/3b

Other embodiments may be carried out by a person having ordinary skill in the art with combinations or modifications of the features, structures, effects, and the like described in the above-described embodiments. Therefore, the contents relevant to the combinations and modifications will be construed as being incorporated in the scope of the embodiments.

The invention claimed is:

1. A tile-type decorative flooring material comprising:
a flooring material part including a surface-processed layer, a clear layer, a design-print layer, and an underlayer; and
a micro-embossed plastic foam part including a plastic foam layer and an adhesive film layer with micro-embossing,
wherein the micro-embossing comprises irregularities having a depth (a) provided at regular intervals (b), and the micro-embossing satisfies Expression 1 below:

$$a \geq 1/3 * b \quad \text{[Expression 1]}$$

(herein, 0.08 mm≤a≤0.8 mm and 0.2≤b≤2 mm), and
wherein the tile-type decorative flooring material has a coefficient of friction of 40 to 56 tested by using a pendulum of BS-7976-2.

2. The tile-type decorative flooring material of claim 1, wherein the plastic foam layer includes 3 to 10 parts by weight of an azodicarbonamide foaming agent, 0.2 to 1.5 parts by weight of an accelerator, 0.1 to 1 part by weight of a foam stabilizer, and other additives, based on 100 parts by weight of olefin-based resin, and is a layer formed after extrusion processed and then foamed.

3. The tile-type decorative flooring material of claim 1, wherein the adhesive film layer further includes 0.1 to 1 part by weight of an antioxidant, 0.1 to 1 part by weight of a processing aid, and other additives, based on 100 parts by weight of olefin-based resin, and is an olefin-based film having a thickness of 10 μm to 200 μm.

4. The tile-type decorative flooring material of claim 1, wherein the adhesive film layer further includes 30 to 60 parts by weight of a plasticizer, 1 to 5 parts by weight of a stabilizer, and other additives, based on 100 parts by weight of PVC resin, and is a PVC film having a thickness of 10 μm to 200 μm.

5. The tile-type decorative flooring material of claim 1, wherein the surface-processed layer includes 20 to 40 parts by weight of monoester, 10 to 20 parts by weight of oligomer, 10 to 20 parts by weight of poly diacrylate, 0.5 to 5 parts by weight of silicon, and other additives,
wherein the surface-processed layer has a thickness of 5 μm to 20 μm, and
wherein the surface-processed layer is hardened by ultraviolet rays.

6. The tile-type decorative flooring material of claim 1, wherein the clear layer includes 10 to 50 parts by weight of a plasticizer, 1 to 5 parts by weight of a stabilizer, and other additives, based on 100 parts by weight of PVC resin, and is a layer having a thickness of 0.1 mm to 1 mm.

7. The tile-type decorative flooring material of claim 1, wherein the design-print layer includes 1 to 20 parts by weight of a plasticizer, 1 to 5 parts by weight of a stabilizer, 0 to 20 parts by weight of a filler, 1 to 5 parts by weight of a processing aid, and other additives, based on 100 parts by weight of PVC resin, and is a layer having a thickness of 0.05 mm to 0.2 mm.

8. The tile-type decorative flooring material of claim 1, wherein the underlayer includes 10 to 60 parts by weight of a plasticizer, 1 to 5 parts by weight of a stabilizer, 50 to 600 parts by weight of a filler, 1 to 5 parts by weight of a processing aid, and other additives, based on 100 parts by weight of PVC resin, and is a layer having a thickness of 0.5 mm to 5 mm.

9. The tile-type decorative flooring material of claim 1, wherein the flooring material part further includes an intermediate layer provided between the design-print layer and the underlayer, in which the intermediate layer includes 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, and is a layer having a thickness of 0.2 mm to 2 mm.

10. The tile-type decorative flooring material of claim 1, wherein the flooring material part further includes any at least one layer selected from the group consisting of an intermediate layer, a dimension reinforcement layer, and a balance layer,
the intermediate layer includes 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, and is a layer having a thickness of 0.2 mm to 2 mm,
the dimension reinforcement layer includes 50 to 90 parts by weight of a plasticizer, 1 to 5 parts by weight of a stabilizer, 10 to 150 parts by weight of a filler, 2 to 10 parts by weight of a viscosity modifier, and other additives, based on 100 parts by weight of PVC paste resin, and is a layer formed by impregnating a glass fiber mat in a liquid paste sol and heat-hardening the impregnated glass fiber, and
the balance layer includes 10 to 60 parts by weight of a plasticizer, 1 to 5 parts by weight of a stabilizer, 50 to 500 parts by weight of a filler, 1 to 5 parts by weight of a processing aid, and other additives, based on 100 parts by weight of PVC resin, and is a layer having a thickness of 0.3 mm to 3 mm.

11. A method for manufacturing a tile-type floor decorative flooring material, the method comprising:
forming a flooring material part by laminating an underlayer, a design-print layer, a clear layer, and a surface-processed layer;

forming a plastic foam layer by extruding a plastic foam layer composition on a rear surface of the underlayer, and electron beam crosslinking, and then foaming or chemical foaming the composition; and forming an adhesive film layer by adhering an adhesive film layer composition to a rear surface of the plastic foam layer while extruding the adhesive film layer composition and simultaneously providing micro-embossing by using an emboss roll, wherein the micro-embossing comprises irregularities having a depth (a) provided at regular intervals (b), and the micro-embossing satisfies Expression 1 below:

$$a \geq \tfrac{1}{3} * b \qquad \text{[Expression 1]}$$

(herein, 0.08 mm≤a≤0.8 mm and 0.2≤b≤2 mm), and wherein the tile-type decorative flooring material has a coefficient of friction of 40 to 56 tested by using a pendulum of BS-7976-2.

\* \* \* \* \*